United States Patent [19]

Chao

[11] Patent Number: 5,568,207
[45] Date of Patent: Oct. 22, 1996

[54] AUXILIARY LENSES FOR EYEGLASSES

[76] Inventor: Richard Chao, No. 43-4, Yi Hsin Tsuen, Shui San Hsiang, Chia Yi Hsien, Taiwan

[21] Appl. No.: 554,854

[22] Filed: Nov. 7, 1995

[51] Int. Cl.⁶ ............................. G02C 7/08; G02C 9/00
[52] U.S. Cl. .............................. 351/57; 351/47
[58] Field of Search .................... 351/41, 44, 47, 351/57, 158; 2/441, 443

[56] References Cited

U.S. PATENT DOCUMENTS 5,416,537 5/1995 Sadler ........................ 351/47

*Primary Examiner*—Huy Mai
*Attorney, Agent, or Firm*—Peterson, Wicks, Nemer & Kamrath, P.A.

[57] ABSTRACT

An eyeglass device includes a primary and an auxiliary spectacle frames for supporting lenses. The primary spectacle frame includes two legs pivotally coupled to two side extensions and includes two magnetic members secured in the rear and side portions. The auxiliary spectacle frame includes two legs engaged on the primary spectacle frame and each having a magnetic member for engaging with the magnetic members of the primary spectacle frame so as to secure the spectacle frames together and so as to prevent the auxiliary spectacle frame from moving downward relative to the primary spectacle frame.

2 Claims, 2 Drawing Sheets

AUXILIARY LENSES FOR EYEGLASSES

BACKGROUND OF THE INVENTION

1. Field of the Invention

The present invention relates to auxiliary lenses, and more particularly to auxiliary lenses for eyeglasses.

2. Description of the Prior Art

A typical spectacle frame having an attachable one-piece slide-on rim is disclosed in U.S. Pat. No. 4,070,103 to Meeker. In Meeker, a spectacle frame includes a magnetic material secured to the peripheral portion thereof for facilitating attachment of the auxiliary lens rim cover to the spectacle frame. The lens rim cover also includes a magnetic strip for engaging with the magnetic material of the spectacle frame.

Another typical eyeglasses are disclosed in U.S. Pat. No. 5,416,537 to Sadler and comprise first magnetic members secured to the temporal portions of the frames and second magnetic members secured to the corresponding temporal portions of the auxiliary lenses.

In both of the eyeglasses, the auxiliary lenses are simply attached to the frames by magnetic materials and have no supporting members for preventing the auxiliary lenses from moving downward relative to the frames such that the auxiliary lenses may easily move downward relative to the frames and may be easily disengaged from the frames when the users conduct jogging or jumping exercises. In addition, the magnetic materials are embedded in the frames of the primary lenses and of the auxiliary lenses such that the frames should be excavated with four or more cavities for engaging with the magnetic members and such that the strength of the frames is greatly decreased.

The present invention has arisen to mitigate and/or obviate the afore-described disadvantages of the conventional spectacle frames.

SUMMARY OF THE INVENTION

The primary objective of the present invention is to provide auxiliary lenses which may be stably secured and supported on the frames.

In accordance with one aspect of the invention, there is provided an eyeglass device comprising a primary spectacle frame for supporting primary lenses therein, the primary spectacle frame including two side portions each having an extension extended therefrom for pivotally coupling a leg means thereto, the primary spectacle frame including two rear and side portions each having a projection secured thereto, the primary spectacle frame including an upper portion, a pair of first magnetic members secured in the projections respectively, an auxiliary spectacle frame for supporting auxiliary lenses therein, the auxiliary spectacle frame including two side portions each having an arm extended therefrom for extending over and for engaging with the upper portion of the primary spectacle frame, and a pair of second magnetic members secured to the arms respectively for engaging with the first magnetic members of the primary spectacle frame so as to secure the auxiliary spectacle frame to the primary spectacle frame. The arms are engaged with and supported on the upper portion of the primary spectacle frame so as to allow the auxiliary spectacle frame to be stably supported on the primary spectacle frame and so as to prevent the auxiliary spectacle frame from moving downward relative to and so as to prevent the auxiliary spectacle frame from being disengaged from the primary spectacle frame.

The projections and the first magnetic members are arranged lower than the upper portion of the primary spectacle frame, the second magnetic members are extended downward toward the projections for hooking on the primary spectacle frame so as to further secure the auxiliary spectacle frame to the primary spectacle frame. The auxiliary spectacle frame may be prevented from disengaging from the primary spectacle frame.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
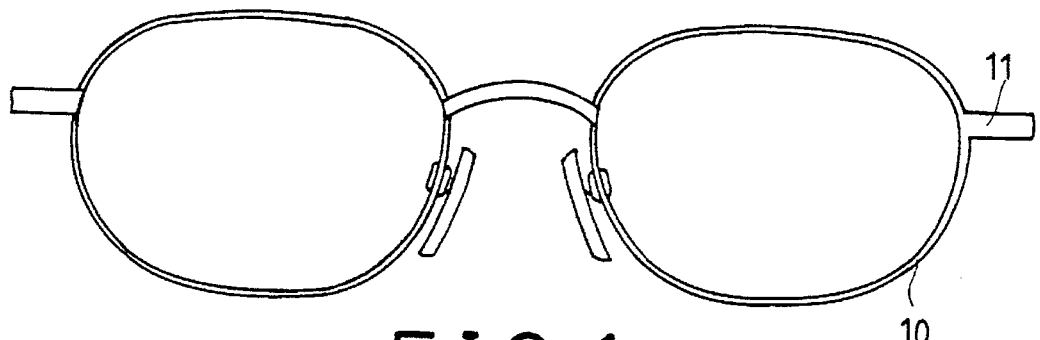
FIGS. 1 and 2 are front views of a spectacle frame and of auxiliary lenses in accordance with the present invention respectively.
Figure 2:
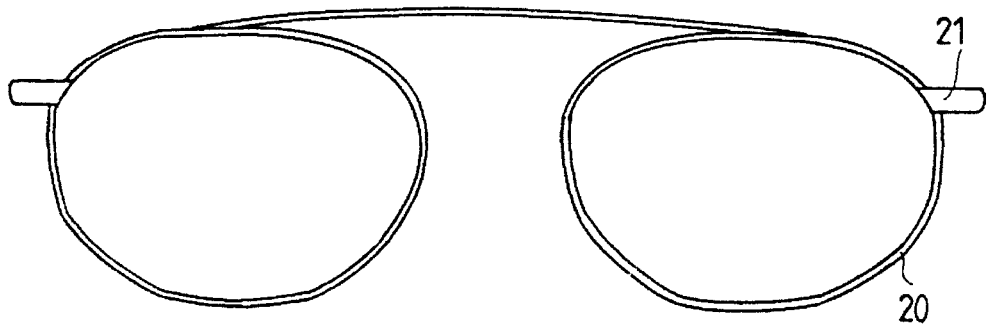
Figure 3:
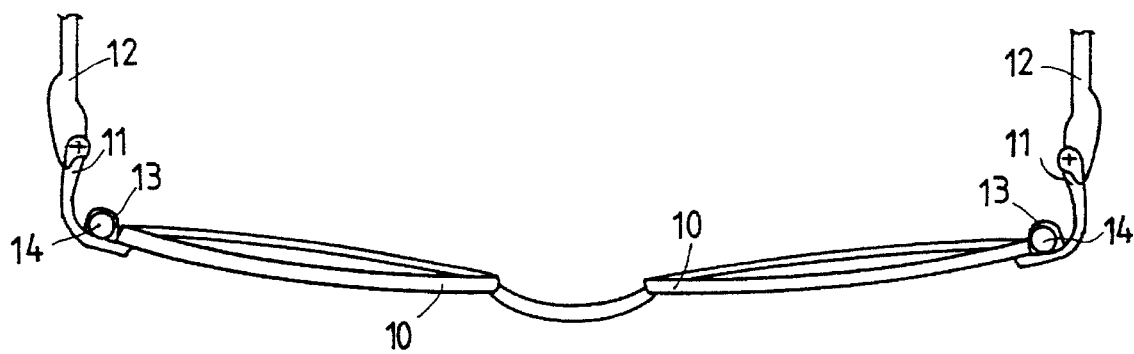
FIGS. 3 and 4 are top views of the spectacle frame and of the auxiliary lenses respectively.
Figure 4:
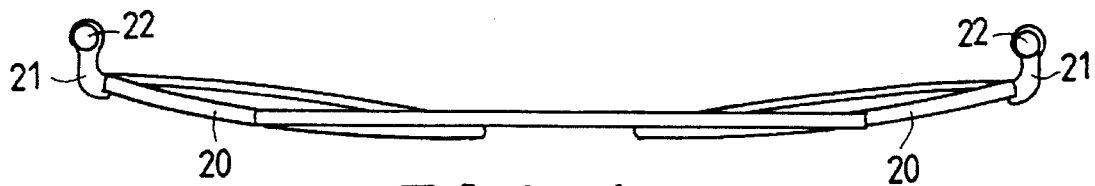
Figure 5:
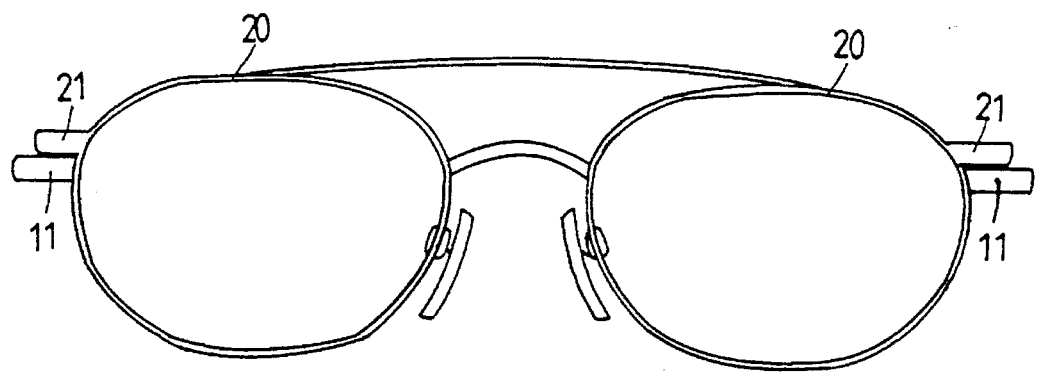
FIG. 5 is a front view of the spectacle frame and the auxiliary lenses combination.
Figure 6:
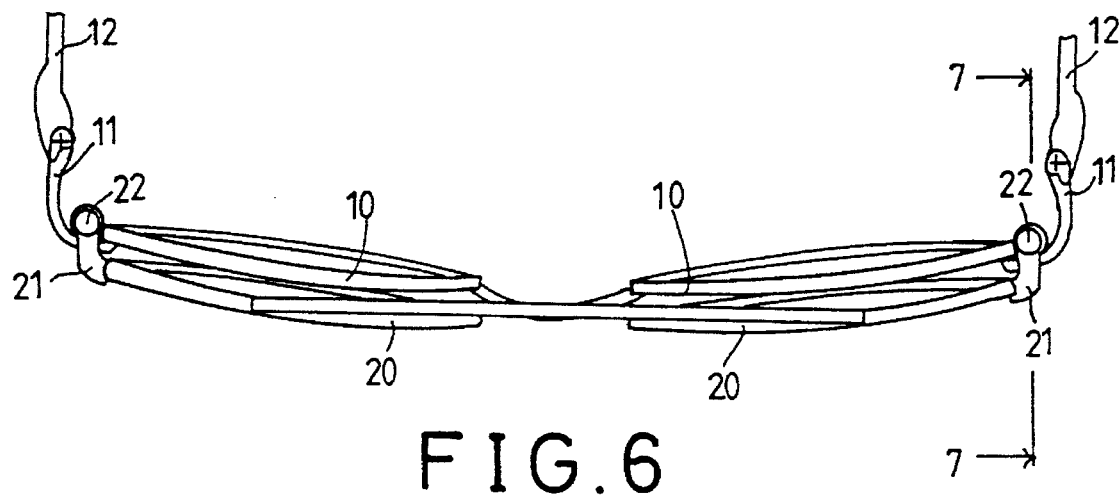
FIG. 6 is a top view of the spectacle frame and the auxiliary lenses combination.

Referring to the drawings, and initially to FIGS. 1 to 4, an eyeglass device in accordance with the present invention comprises a primary spectacle frame 10 for supporting primary lenses therein. The primary spectacle frame 10 includes two side portions each having an extension 11 extended rearward therefrom for pivotally coupling leg 12 thereto. The primary spectacle frame 10 includes two projections 13 secured to the rear and side portions thereof for supporting magnetic members 14 therein. An auxiliary spectacle frame 20 is provided for supporting the auxiliary lenses therein and includes two side portions each having an arm 21 extended rearward therefrom for extending over and for engaging with the upper portion of the primary spectacle frame 10 (FIGS. 5 and 6). The auxiliary spectacle frame 20 also includes two magnetic members 22 secured to the arms 21 thereof for engaging with the magnetic members 14 of the primary spectacle frame 10 such that the auxiliary spectacle frame 20 may be stably supported on the primary spectacle frame 10, best shown in FIGS. 5 and 6.

It is to be noted that the arms 21 are engaged with and are supported on the upper portion of the primary spectacle frame 10 such that the auxiliary spectacle frame 20 may be stably supported and secured to the primary spectacle frame 10. The auxiliary spectacle frame 20 will not move downward relative to the primary spectacle frame and will not be easily disengaged from the primary spectacle frame when the users conduct jogging or jumping exercises.

It is further to be noted that the projections 13 and the magnetic members 14 are secured to the primary spectacle frame 10 and the magnetic members 22 are secured in the arms 21. The magnetic members 14, 22 are not embedded in the frames 10, 20 such that the frames 10, 20 are not required to be formed with cavities therein and such that the strength of the frames 10, 20 will not be decreased.

Figure 7:
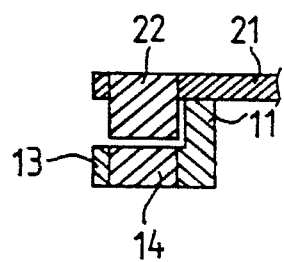
FIG. 7 is a cross sectional view taken along lines 7—7 of FIG. 6.

Referring next to FIG. 7, it is preferable that the projections 13 and the magnetic members 14 are located slightly lower than the upper portion of the primary spectacle frame 10; and the end portions of the arms 21 and/or the magnetic members 22 are slightly extended downward toward the projections 13 such that the arms 21 and the magnetic members 22 may hook on the primary spectacle frame 10 and such that the auxiliary spectacle frame 20 may further be stably supported and secured to the primary spectacle frame 10.

Accordingly, the eyeglass device in accordance with the present invention includes an auxiliary spectacle frame that may be stably secured to the primary spectacle frame and will not move downward relative to the primary spectacle frame and will not be easily disengaged from the primary spectacle frame when the users conduct jogging or jumping exercises. In addition, the magnetic members are not embedded in the frames such that the strength of the frames will not be decreased.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. An eyeglass device comprising:

a primary spectacle frame for supporting primary lenses therein, said primary spectacle frame including two side portions each having an extension extended therefrom for pivotally coupling a leg means thereto, said primary spectacle frame including two rear and side portions each having a projection secured thereto, said primary spectacle frame including an upper side portion, a pair of first magnetic members secured in said projections respectively, an auxiliary spectacle frame for supporting auxiliary lenses therein, said auxiliary spectacle frame including two side portions each having an arm extended therefrom for extending over and for engaging with said upper side portion of said primary spectacle frame, and a pair of second magnetic members secured to said arms respectively for engaging with said first magnetic members of said primary spectacle frame so as to secure said auxiliary spectacle frame to said primary spectacle frame, said arms being engaged with and supported on said upper side portion of said primary spectacle frame so as to allow said auxiliary spectacle frame to be stably supported on said primary spectacle frame and so as to prevent said auxiliary spectacle frame from moving downward relative to said primary spectacle frame and so as to prevent said auxiliary spectacle frame from being disengaged from said primary spectacle frame.

2. An eyeglass device according to claim 1, wherein said projections and said first magnetic members are arranged lower than said upper side portion of said primary spectacle frame, said second magnetic members are extended downward toward said projections for hooking on said primary spectacle frame so as to further secure said auxiliary spectacle frame to said primary spectacle frame.

* * * * *